July 26, 1966     H. V. HENDERSON     3,262,400
DRIVES FOR OVERHEAD HAULAGE VEHICLES
Filed July 6, 1965                    2 Sheets-Sheet 1

INVENTOR
HERBERT VICTOR HENDERSON
By Shoemaker and Mattare
Attys.

July 26, 1966  H. V. HENDERSON  3,262,400
DRIVES FOR OVERHEAD HAULAGE VEHICLES
Filed July 6, 1965  2 Sheets-Sheet 2
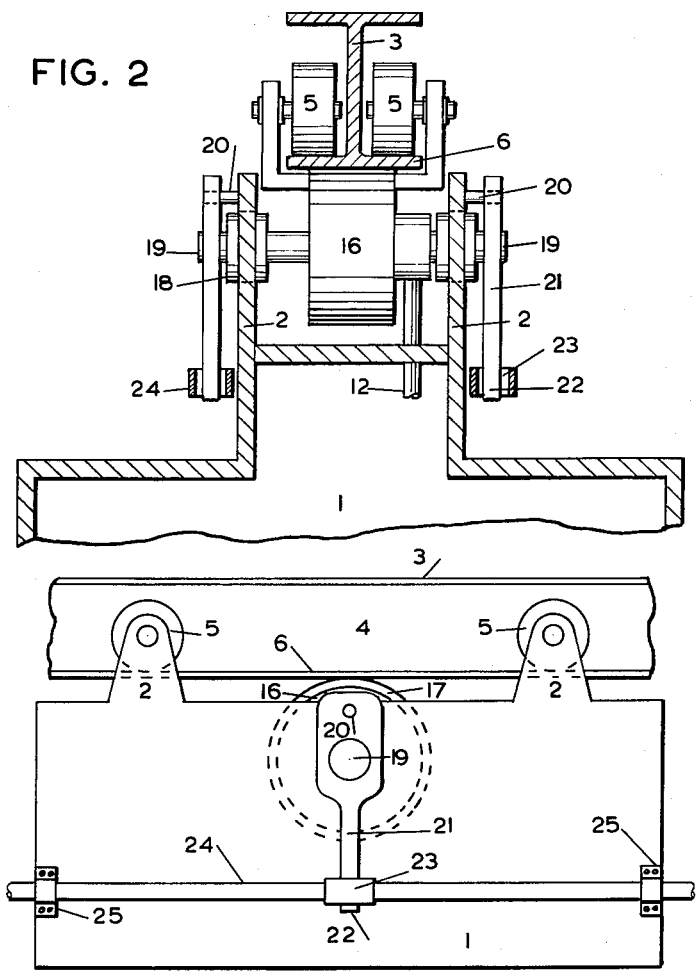
INVENTOR
HERBERT VICTOR HENDERSON
By Shoemaker and Mattare
ATTYS.

United States Patent Office

3,262,400
Patented July 26, 1966

3,262,400
DRIVES FOR OVERHEAD HAULAGE VEHICLES
Herbert V. Henderson, Germiston, Transvaal, Republic of South Africa, assignor to Anglo-Transvaal Consolidated Investment Company Limited, Johannesburg, Transvaal, Republic of South Africa
Filed July 6, 1965, Ser. No. 469,543
Claims priority, application Republic of South Africa, July 10, 1964, 64/3,271
2 Claims. (Cl. 105—73)

This invention relates to drives for overhead haulage vehicles and more particularly to locomotives coupled to propel one or more carriages or tubs with the train suspended from an overhead track.

It will be appreciated that it is desirable to drive locomotives such as those above referred to with sufficient adhesion between the driving wheels and rails to propel the load at a given time and under the particular existing circumstances without slippage between drive wheels and rails while at the same time not applying unnecessarily large pressures to the drive wheels.

The object of the present invention is to provide a drive arrangement for such vehicles wherein the pressure applied by the drive wheels to the rails will vary automatically with the load to be moved.

According to this invention there is provided a locomotive adapted to be suspended from an overhead track said locomotive comprising a rigid frame having track engaging wheels to be positioned on opposite sides of the track, a rotatable support secured to at least one wheel having its axis movable in position relative to the frame, the centre of rotation of the support being between the axes of the upper and lower wheels, a draw-bar for the locomotive mounted to permit limited movement thereof longitudinally with respect of the frame, and operatively connected to the support, and a drive for at least one of the track engaging wheels.

A preferred embodiment of this invention will be described with reference to the accompanying drawings in which:

FIGS. 2 and 3 are diagrammatic representations illustrating the operation of this invention.

Figure 1:
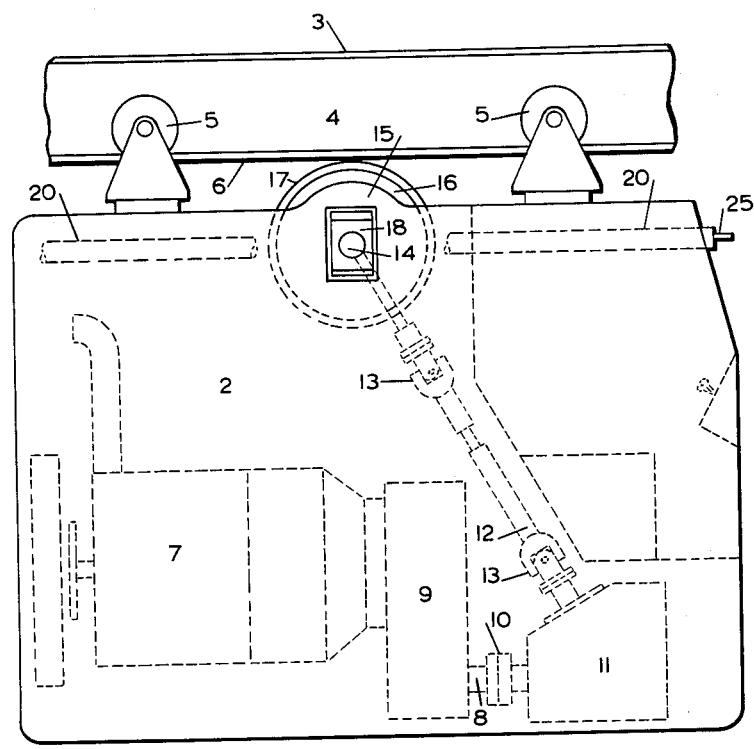
FIG. 1 is a general diagrammatic view of a locomotive.

It will be appreciated that the monorail locomotive illustrated in FIG. 1 is only one form of locomotive suitable for use with the present invention. Other constructions may be used provided either the drive or running wheels and the draw-bar are supported by but movable relative to the locomotive frame in the manner set forth above.

Briefly then with regard to FIG. 1 a practical form of locomotive 1 comprises a rigid frame 2 suspended from a track 3 which may conveniently be in the form of an I beam 4. The frame 2 is supported from two pairs of running wheels 5 which wheels are rotatably mounted on axles located towards the ends of the frame which axles will preferably be secured to the frame 2 in any convenient manner in swivel mountings which ensures that no longitudinal or vertical displacement of these wheels 5 relative to the frame 2 can take place.

As shown the wheels 5 run on the upper surfaces of the lower flanges 6 of I beam 4.

The frame 2 also houses the prime mover for the locomotive which may be a diesel engine 7 illustrated by the dotted lines representation and the drive 8 from this engine is connected either directly or through a torque convertor 9 by a coupling 10 to a suitable reduction gearing unit 11. The output from the unit 11 is connected by means of an extensible drive shaft 12 and universal joints 13 to the shaft 14 of a single drive wheel assembly 15.

The assembly 15 is mounted in the frame 2 so that drive wheel 16 engages the undersurface of flanges 6 of I beam 4. The wheel 16 is preferably provided with a resilient tyre 17 made of material which will promote frictional engagement between wheel 16 and flange 6.

The drive wheel 16 is located in a central position relative to the running wheels 5 and the axle therefor is supported in bearing blocks 18.

The locomotive frame 2 also embodies in operator's cab with the necessary controls for operation of the locomotive.

Spring means (not illustrated) may be incorporated in the assembly to ensure that a certain minimum pressure is applied to the wheel supports to ensure engagement between tyre 17 and track surface.

The lowest position of the drive wheel 16 is made to afford sufficient adhesion to drive at least the locomotive on its own without any load such as a train of carriages or tubs.

Referring now more particularly to diagrammatic drawings of FIGS. 2 and 3 it will be seen that the bearing blocks are located in robust guides 19 in a manner which allows a limited swinging movement of the wheel 16 such swinging movement having a component vertical to the surface of the track 3 engaged by wheel 16.

The drive wheel 16 is retained in position in a support 19 which is mounted on the frame 2 in a manner which will permit limited rotation of the support 19 about an axis parallel to the axis of rotation of the wheel 16. The point of rotation 20 of the support 19 is located vertically above the wheel centre, that is closer to the undersurface of the track 3 against which the drive wheel 16 operates. Due to the eccentricity between the axes of rotation of wheel 16 and support 19 it will be appreciated that any rotation of the support 19 will cause the periphery 17 of the wheel 16 to be pressed into tighter engagement with the track 3.

To make the degree of engagement of the drive wheel 16 dependent on the load to be drawn by the locomotive the support is connected through a rigid arm 21 having one end attached to said support and with the other end 22 guided as shown at 23 to be moved by movement of a draw-bar 24 for the locomotive 1. This draw-bar 24 is mounted in guides 25 on the frame 2 to have a limited movement longitudinally with respect to the frame 2.

With no load coupled to the draw-bar 24 the link 21 will be in a vertical position with a minimum pressure of engagement between the drive wheel 16 and the track 3. This minimum pressure will be sufficient to ensure that the locomotive can be driven under its own load only. Any load attached to the draw-bar 24 will cause, on movement of the locomotive 1, relative movement of the draw-bar 24 with respect to the locomotive frame 2. This movement is transmitted through the link 21 to rotate the eccentrically mounted wheel support 19 with the effect described above.

The force with which the wheel 16 is pressed against the track 3 is dependent on the amount of eccentricity between the axes of rotation of the wheel 16 and its support 19.

The variable drive above described may be made to have very little friction between the moving parts and the limited movement of the drive wheel 16 will facilitate the drive mechanism being a simple and robust construction.

The wheel arrangement described in the above example may be varied and also more than one wheel may be driven if this is desirable. Also, if desired the automatic adjustment of the pressure of engagement by the wheels with the track can be effected on all track engaging wheels.

The arrangement above described will of course preferably be provided on each side of the plane of rotation of the drive wheel 16 so that the wheel will be moved evenly with respect to the frame in the assembly above set out. The draw-bar 24 will be bifurcated so that it may cooperate in the manner set forth with both links 21, one on each side of the wheel 16.

What I claim as new and desire to secure by Letters Patent is:

1. A locomotive adapted to be suspended from an overhead track, said locomotive comprising a rigid frame having track engaging wheels relatively positioned for engagement against opposite sides of the support track, bearing blocks carried by and spaced apart transversely of said frame, means supporting said blocks on the frame to have up and down movement relative thereto, one of said track engaging wheels being a drive wheel which is operatively connected with said bearing blocks for rotation, a draw bar extending longitudinally along one side of said frame, means on the frame supporting the draw bar for reciprocal movement, the draw bar being substantially perpendicular to the rotational axis of said drive wheel and being below said axis, said operative connection of the drive wheel with the bearing blocks including support guide means for the drive wheel adapted to permit swinging movement of the wheel in the longitudinal direction of the track, a rigid arm having upper and lower ends and connected intermediate its ends to said support guide means, means pivotally mounting the upper end of said arm on said frame above the rotational axis of the wheel to swing in a plane crossing said axis, guide means carried by said draw bar having the lower end of said arm loosely received therein whereby upon longitudinal movement of said draw bar said arm pivots about said pivotal mounting to raise and lower said drive wheel, and drive means for said drive wheel.

2. A locomotive adapted to be suspended from an overhead track, said locomotive comprising a rigid frame having track engaging wheel relatively positioned for engaging against opposite sides of the support track, bearing blocks carried by opposite sides of the frame and mounted thereon to have up and down movement relative thereto, one of said track engaging wheels being a drive wheel and operatively connected with said bearing blocks for rotation, a draw bar extending longitudinally along each of said opposite sides of said frame, means on the frame supporting said draw bars for reciprocal movement, the draw bars being substantially perpendicular to the rotational axis of said wheel and being below said axis, said operative connection of the drive wheel with the bearing blocks including support guide means for the drive wheel at each side of the frame adapted to permit swinging movement of the wheel in the longitudinal direction of the track, a rigid arm at each side of the frame, each arm having upper and lower ends and each connected intermediate its ends to the adjacent support guide means, means pivotally mounting the upper end of said arm to the frame above the rotational axis of the wheel to swing in a plane crossing said axis, guide means carried by each draw bar having the lower end of the adjacent arm loosely received therein whereby upon longitudinal movement of said draw bar said arm pivots about said pivotal mounting to raise and lower said drive wheel, and drive means for said drive wheel.

References Cited by the Examiner
UNITED STATES PATENTS

| | | | |
|---|---|---|---|
| 1,375,726 | 4/1921 | Patton | 105—30 |
| 2,063,471 | 12/1936 | Stedfeld | 105—130 |
| 2,655,871 | 10/1953 | Mazzola | 105—30 |
| 3,176,628 | 4/1965 | Reid | 105—153 |

ARTHUR L. LA POINT, *Primary Examiner*

B. F. FAUST, *Assistant Examiner.*